(12) United States Patent
Comtesse

(10) Patent No.: US 6,820,559 B1
(45) Date of Patent: Nov. 23, 2004

(54) MOVING PART DEVICE FOR THE TEMPORARY CONNECTION AND PYROTECHNIC SEPARATION OF TWO ELEMENTS

(75) Inventor: Patrick Comtesse, Mezieres sur Seine (FR)

(73) Assignee: Eads Launch Vehicles, Paris (FR)

( * ) Notice: Subject to any disclaimer, the term of this patent is extended or adjusted under 35 U.S.C. 154(b) by 10 days.

(21) Appl. No.: 10/425,959

(22) Filed: Apr. 30, 2003

(30) Foreign Application Priority Data

May 7, 2002 (FR) .............................................. 02 05720

(51) Int. Cl.⁷ .............................................. F42B 15/38
(52) U.S. Cl. ........................................ 102/378; 89/1.14
(58) Field of Search ................................ 102/377, 378; 89/1.14

(56) References Cited

U.S. PATENT DOCUMENTS

| | | | | |
|---|---|---|---|---|
| 3,071,404 A | * | 1/1963 | Van Hove ................ | 294/82.29 |
| 3,140,886 A | * | 7/1964 | Cotilla et al. ................. | 403/11 |
| 3,265,408 A | * | 8/1966 | Dickie ........................... | 285/3 |
| 3,362,290 A | | 1/1968 | Carr et al. | |
| 3,633,456 A | * | 1/1972 | Carr et al. ................... | 89/1.14 |
| 3,705,550 A | * | 12/1972 | Long .......................... | 102/378 |
| 4,137,848 A | | 2/1979 | Cunha | |
| 4,879,941 A | * | 11/1989 | Repe et al. .................. | 89/1.14 |
| 6,142,424 A | | 11/2000 | Wagner | |
| 6,170,400 B1 | | 1/2001 | Salort | |
| 6,250,227 B1 | | 6/2001 | Salort | |
| 6,286,430 B1 | | 9/2001 | Salort | |
| 6,679,177 B1 | * | 1/2004 | Wu et al. ................... | 102/377 |
| 2004/0094673 A1 | * | 5/2004 | Valembois et al. ......... | 244/161 |

FOREIGN PATENT DOCUMENTS

| | | | | |
|---|---|---|---|---|
| EP | 0 246 958 | | 11/1987 | |
| EP | 0 273 061 | | 7/1988 | |
| EP | 0 905 022 | | 3/1999 | |
| FR | 2 598 796 | | 11/1987 | |
| FR | 2 779 222 | | 12/1999 | |
| FR | 2 779 223 | | 12/1999 | |
| FR | 2 779 224 | | 12/1999 | |
| GB | 1077581 | * | 8/1967 | ................. 102/378 |

\* cited by examiner

Primary Examiner—Jack Keith
Assistant Examiner—James S. Bergin
(74) Attorney, Agent, or Firm—Oblon, Spivak, McClelland, Maier & Neustadt, P.C.

(57) ABSTRACT

The temporary connection of two elements (12, 14) is ensured by U-shaped connecting components (16) held in place by a moving part (18). A pyrotechnic composition (20) is housed between two shoulders (32, 36) situated respectively on the first of the elements (12) and on the moving part. Igniting the pyrotechnic composition (20) causes the moving part (18) to slide over the first element (12). The connecting components (16) are released and the connection between the elements (12, 14) is eliminated without breaking any parts.

13 Claims, 2 Drawing Sheets

MOVING PART DEVICE FOR THE TEMPORARY CONNECTION AND PYROTECHNIC SEPARATION OF TWO ELEMENTS

TECHNICAL FIELD

The invention concerns a device that is capable of forming a temporary connection between two elements and using a pyrotechnic composition to control the displacement of a moving part, in order to separate said elements without requiring the breakage of any part whatsoever.

Such a device could in particular be used in the aeronautical and space industries to rapidly separate two structural elements, while at the same time ensuring the transmission of any large forces as required between these two elements before the separation occurs.

PRIOR ART

When two elements between which forces are transferred require to be very rapidly and irreversibly separated by remote control, it is common practice to use pyrotechnic separation devices incorporated within the connection zone of the two elements The pyrotechnic separation devices generally comprise a pyrotechnic expansion tube, that is to say a sealed, deformable metal tube containing a detonating fuse. A flexible material such as rubber is placed between the detonating fuse and the surrounding tube. Prior to firing, the tube has an oblong cross section, for example of an elliptical or flattened circular shape.

When the detonating fuse is ignited, the shock wave that travels at very high speed along the length of the tube deforms it and tends to give it a circular cross section.

In existing pyrotechnic separation devices, the pyrotechnic expansion tube is used to cut one of the two elements along a given cutting line so as to separate the two elements from one another.

In the case where the elements to be separated are metallic, it is known for the pyrotechnic expansion tube to be housed in the base of a U-shaped recess formed in one of these elements. The other element is then connected into the opening of this recess, for example by means of bolts or similar. The ignition of the detonating fuse causes the two side legs of the recessed element to break along lines defined by zones of reduced thickness. Documents FR-A-2 598 796 and EP-A-0 273 061 illustrate devices of this type.

It is also known, as shown by document U.S. Pat. No. 4,137,848, for the pyrotechnic expansion tube to be housed between two facing parts of the metallic elements to be separated, by reducing the thickness of on of said parts. The two elements are connected to one another by bolts or similar, to one side of the tube and in proximity to it. The ignition of the detonating fuse causes the part of reduced thickness to break.

Document U.S. Pat. No. 3,362,290 describes an arrangement very similar to that described in documents FR-A-2 598 796 and EP-A-0 273 061. However, instead of causing the recessed element to break, in this case the ignition of the detonating fuse causes the shearing of the rivets that serve to connect the two elements before their separation. To this end, the rivets are hollow and of small diameter.

Where the elements to be separated are of a sandwich construction, it has been proposed to house the pyrotechnic expansion tube in a part of these structures devoid of a hollow core. Igniting the detonating fuse then has the effect of cutting the parts of the cladding situated opposite said tube. Arrangements of this type are described in documents FR-A-2 779 223 and FR-A-2 779 224.

Document FR-A-2 779 222 describes a similar arrangement, in which the two elements are initially connected to one another by at least one glued connecting piece. When the fuse is ignited, the expansion of the tube causes the connection piece to come loose and the two elements to separate.

In summary, all of the known pyrotechnic separation devices used in conjunction with metallic parts achieve the separation of said parts by causing one of them to break or shearing the components that connect them together. The same generally also applies in the case of devices used with parts made from composite materials.

The only exception to this is the case of the mechanism described document FR-A-2 779 22, in which the cutting of one of the two elements is replaced by the removal of a glued connecting component. This type of device can, however, only be used for connecting elements made from composite materials.

DISCLOSURE OF THE INVENTION

The purpose of the invention is the creation of a pyrotechnic separation device, the original design of which enables it to separate elements of any material, in particular metal, without causing the breakage of any part.

According to the invention, this result is obtained by means of a temporary connection and pyrotechnic separation device, consisting of a pyrotechnic composition installed in the connecting area between two elements to be separated, characterised in that the device comprises, in addition, at least one connecting component normally occupying an assembled position in which said connecting component is simultaneously in contact with each of said elements, and a moving part normally occupying a first position in which it maintains the connecting component in its assembled position, the pyrotechnic composition being positioned in such a way as to displace the moving part, under the effect of the pressure of the gases produced, to a second position in which it frees the connecting component, when said pyrotechnic composition is activated.

In this arrangement, the temporary connection between the two elements is ensured jointly by the connecting components, which are in contact with said elements when in their assembled position, and by the moving part, which maintains the connecting components in their assembled position as long as the pyrotechnic composition has not been activated.

According to a preferred embodiment of the invention, the moving part is able to slide over a first of said elements and the pyrotechnic composition is housed between two shoulders formed on the moving part and the first element respectively. Hence, the connecting element is secured in its assembled position when the moving part is in its first position. The activation of the pyrotechnic composition has the effect of displacing the moving part away from the second element and releasing the moving part.

In this case, where the two elements are cylindrical or oval, the moving part will advantageously comprises a deformable section that encloses the connecting component when the moving part is in its first position. This deformable section will then be fitted with clamping means.

The deformable section of the moving part preferably includes separate annular segments, each of which is connected at its centre to a principal section of the moving part, the clamping means being interposed between the adjacent ends of the segments.

The clamping means can in particular consist of tension devices bearing on flanges attached to the adjacent ends of the segments.

Also according to the preferred embodiment of the invention, each connecting component consists of a U-bracket comprising an inner face with a first projecting part and a second projecting part which are accommodated respectively in a first recessed section formed in the first element and in a second recessed section formed in the second element, when the connecting component is in its assembled position.

The device advantageously comprises as many U-brackets as annular segments, with each annular segment enclosing one of the U-brackets when the connecting component is in its assembled position.

BRIEF DESCRIPTION OF THE DRAWINGS

We will now describe, by way of an illustrative, non-limitative example, a preferred embodiment of the invention by referring to the appended drawings, in which.

DETAILED DESCRIPTION OF A PREFERRED EMBODIMENT

Figure 1:
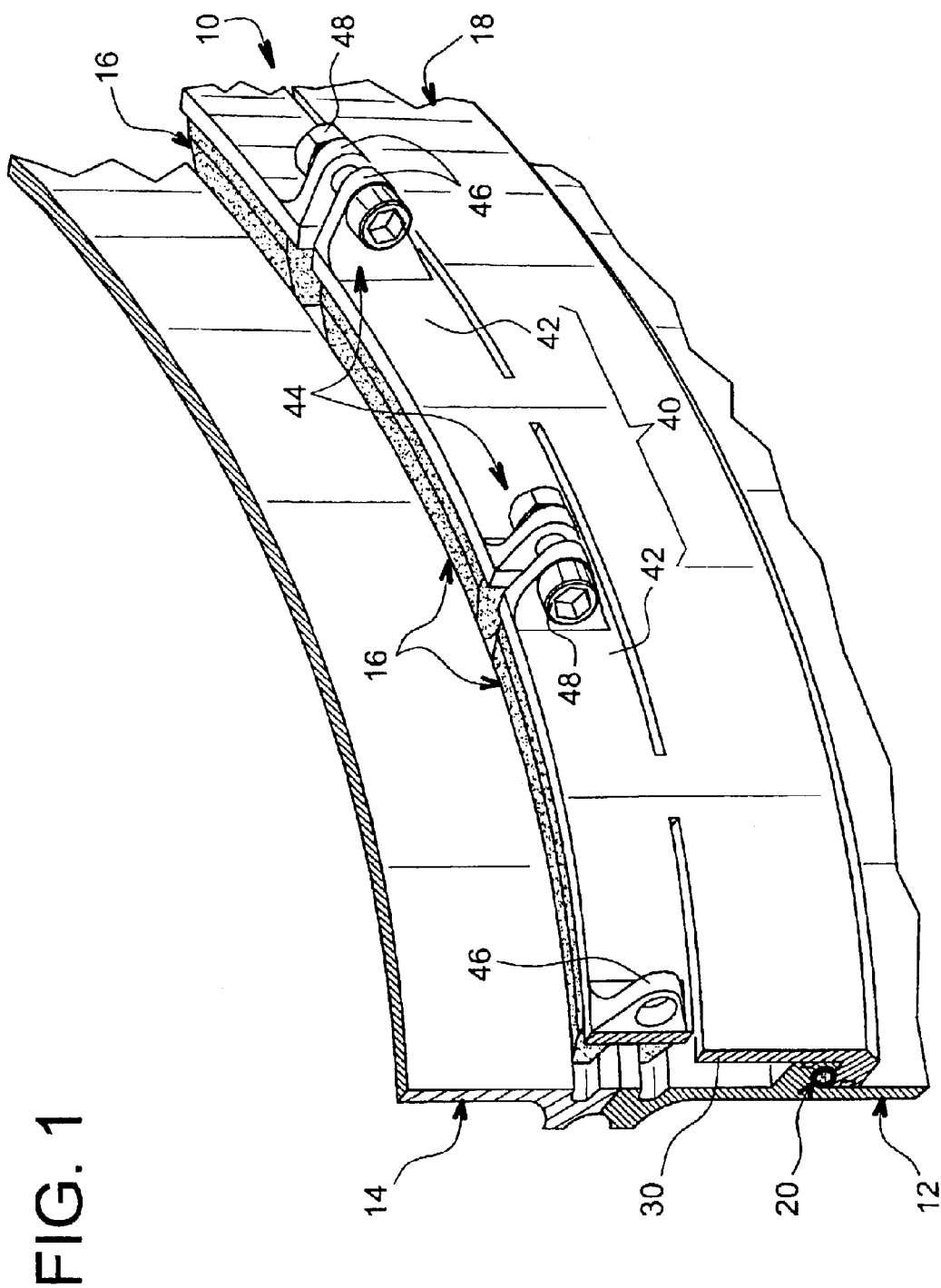
FIG. 1 is a perspective view showing part of a temporary connection and pyrotechnic separation device according to the invention, between two cylindrical elements placed end to end, one above the other.
Figure 2:
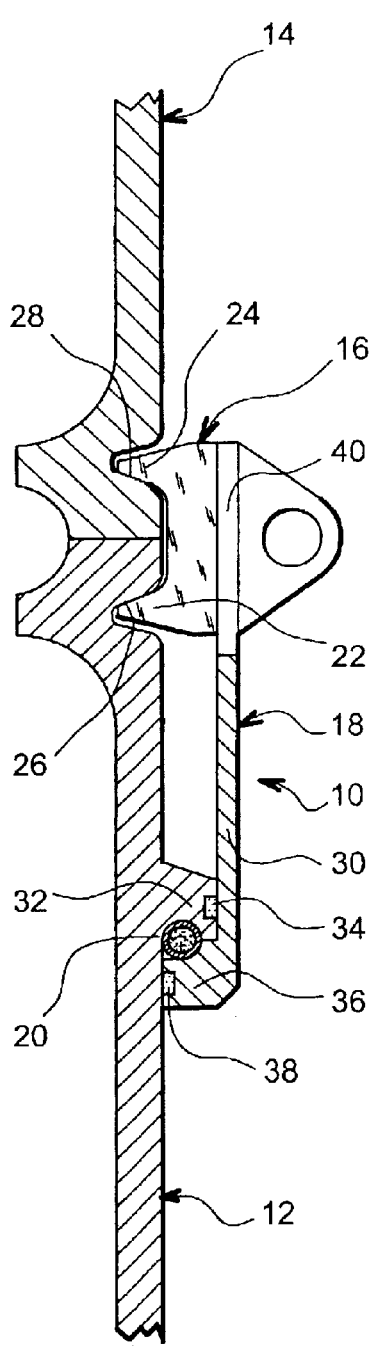
FIG. 2 is a cross sectional view through the device of FIG. 1, prior to activating the pyrotechnic composition.
Figure 3:
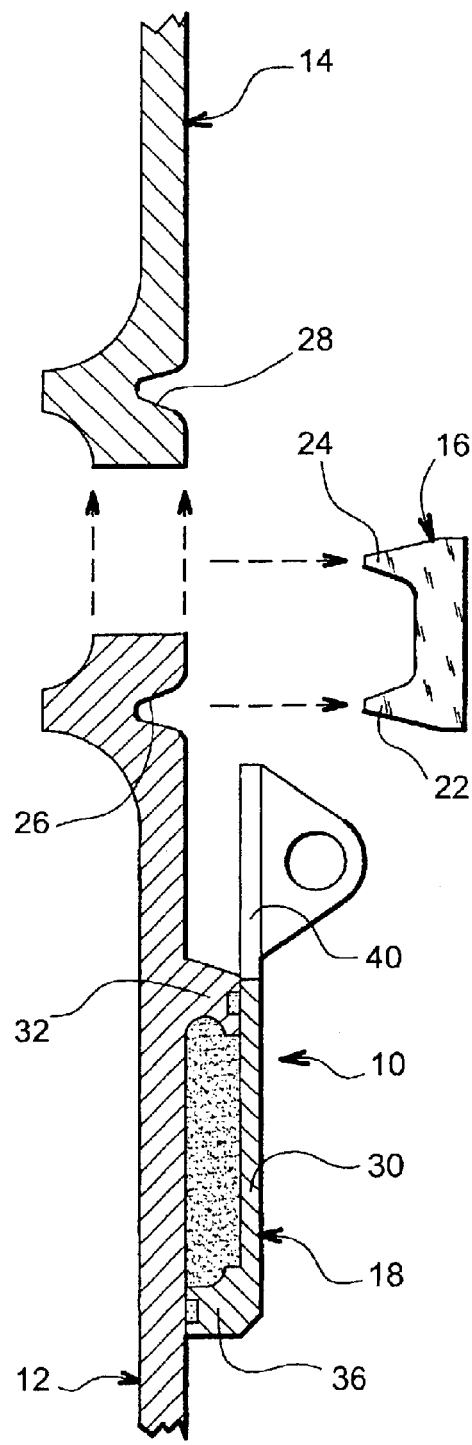
FIG. 3 is a cross sectional view similar to FIG. 2, showing the device after activating the pyrotechnic composition.

FIGS. 1 to 3 show a preferred embodiment of a temporary connection and pyrotechnic separation device 10 placed between a first element 12 and a second element 14.

The first element 12 and the second element 14 advantageously consist of either two annular elements of essentially the same diameter, as shown in the figures, or of two oval shaped panels. In each case, elements 12 and 14 are designed to be assembled end to end, and are placed one above the other.

The device 10 according to the invention is situated in the connecting area between the two elements 12 and 14. It principally comprises at least one connecting component 16, a moving part 18 and a pyrotechnic composition 20 of traditional design.

In the embodiment shown in the figures, the device 10 comprises several connecting components 16 arranged end to end over the periphery of the connecting area between the elements 12 and 14. More specifically, each of the connecting components is materialised by a U bracket that straddles the abutting end sections of elements 12 and 14 and extends over part of the circumference of the connecting area. It the normal assembled position shown in FIGS. 1 and 2, each of the U-brackets is simultaneously in contact with element 12 and with element 14, in such a way that said elements are rigidly connected together.

More specifically, each of the U-brackets formed by the connecting components 16 comprises an inner face, turned towards elements 12 and 14 and on which are formed a first projecting part 22 and a second projecting part 24. When the U-brackets are in their assembled position, the first projecting part 22 and the second projecting part 24 are normally accommodated in a first recessed section 26 and a second recessed section 28 formed in the outer surfaces of the first element 12 and the second element 14 respectively. In the embodiment shown, the recessed sections 26 and 28 are annular grooves formed close to the adjacent ends of elements 12 and 14.

This arrangement ensures the rigid connection of elements 12 and 14 when the U-brackets forming the connecting components 16 are held in their assembled position by the moving part 18, as will be described below.

The U-brackets forming the connecting components 16 have a smooth outer surface, in such a way that the outer surfaces of all the U-brackets form a cylinder of constant diameter, when the U-brackets are in their assembled position.

The moving part 18 is installed on the first element 12 in such a way as to be able to slide over it, parallel to its axis.

More specifically, the moving part includes a principal section 30 shaped like a cylindrical collar, that encloses the first element 12 close to its end which is formed for connection to the second element 14. The principal section 30 of the moving part 18 is able to slide, without loss of seal, over the outer surface of a shoulder 32 projecting from the outer surface of the first element 12. To this end, a gasket 34 is mounted on the outer surface of the shoulder 32 ensuring in sealed contact with the inner surface of the principal section 30.

At its end furthest from the second element 14, the main part 30 of the moving part 18 is fitted with a shoulder 36 on its inner surface. The inner surface of this shoulder is able to slide, without loss of seal, over the outer surface of the first element 12. To this end a gasket 38 is mounted on the inner surface of the shoulder 36 and in sealed contact with the outer surface of the first element 12.

The opposing faces of the shoulders 32 and 36 contain recesses of essentially semi circular cross section, in such a way as to define a housing to receive the pyrotechnic composition 20. When elements 12 and 14 are connected to one another by the device 10 according to the invention, the moving part 18 occupies a first position, shown in FIGS. 1 and 2. In this first position, the shoulder 36 of the moving part is virtually bearing against the shoulder 32 of the first element.

At its opposite end from the shoulder 36, the moving part comprises a deformable section 40. With the moving part 18 in its first position, as shown in FIGS. 1 and 2, the deformable section 40 surrounds the U-brackets forming the connecting components 16.

As shown in more detail in FIG. 1, the deformable part 40 of the moving part 18 comprises a number of annular segments 42. The annular segments 42 are arranged end to end over the entire circumference of the connecting zone, while remaining separate or separated from one another. They form one piece with the principal section 30, to which they are connected at their centre.

When the moving part 18 is in its first position, the deformable section 40 tightly encloses the U-brackets forming the connecting components 16. More specifically, when the moving part is in its first position, the number of annular segments 42 is preferably identical to that of the U-brackets forming the connecting components 16 and each of the segments 42 tightly encloses one of the U-brackets. A rigid connection is thus ensured between elements 12 and 14.

As also shown in FIG. 1, the deformable section 40 of the moving part 18 is fitted with clamping means 44. These clamping means 44 enable the moving part to be secured in its first position until such time as the pyrotechnic composition 20 is activated. They also allow the rigidity of the connection thus formed between the elements 12 and 14 to be ensured.

In the embodiment shown, the clamping means 44 are interposed between the adjacent ends of the annular segments 42.

More specifically, each of the circumferential ends of the segments 42 is fitted with a flange 46 on its outward facing face relative to elements 12 and 14. The clamping means 44 then take the form of tension elements such as bolts 48. Each of the bolts 48 is orientated in the direction of the circumference of the elements 12 and 14 and bears on the two flanges 46 mounted on the adjacent ends of two segments 42, passing through holes formed in said flanges 46.

The arrangement just described makes it possible to block the deformable section 40 of the moving part 18 by tightening each of the bolts 48. In effect, tightening each bolt 48 has the effect of bringing the adjacent ends of the annular segments 42 closer together. Given that the segments 42 are only connected to the principal section 30 of the moving part 18 at their centre sections, this has the effect of deforming the ends of the segments 42 towards the connecting components 16 around which they are placed. In this way, the segments 42 are clamped on the connecting components 16, which has the effect of securing the moving part 18 in its first position shown in FIGS. 1 and 2, and of rigidly connecting elements 12 and 14 together by means of the connecting components 16.

When the detonating fuse of the pyrotechnic composition 20 is ignited, the gasses released have the effect, as shown diagrammatically in FIG. 3, of displacing the moving part away from the second element 14, that is to say, towards the bottom in FIG. 3. The displacement of the moving part 18 has the effect of completely shifting its deformable section 40 relative to the connecting components 16. The holding force exerted up until that point by the clamping means 44 is instantly eliminated and the connecting components can thus separate from the elements 12 and 14, as is shown in FIG. 3.

The ignition of the pyrotechnic composition 20 thus has the effect of eliminating the connection between elements 12 and 14. Elements 12 and 14 are thus separated from one another without breaking any parts. Consequently, the disadvantages resulting from such a breakage are eliminated.

Of course the invention is not limited to the embodiment just described. Thus, as already indicated, the device according to the invention can also be use to connect, and then separate, elements of different geometrics, and in particular oval.

What is claimed is:

1. A temporary connection and pyrotechnic separation device comprising:
    a pyrotechnic composition disposed between first and second elements configured to be separated;
    a connecting component configured to occupy an assembled position to simultaneously in contact the first and second elements with first and second protrusions disposed in the first and second elements; and
    a moving part configured to occupy a first position to maintain the connecting component in the assembled position,
    wherein the pyrotechnic composition is disposed to displace the moving part to a second position to release the connecting component when said pyrotechnic composition is activated.

2. The device according to claim 1, wherein the moving part is configured to slide over the first element, and the pyrotechnic composition is disposed between two shoulders on the moving part and the first element such that the connecting component is secured in the assembled position when the moving part is in the first position and the activation of the pyrotechnic composition displaces the moving part from the second element and releases the connecting component.

3. A temporary connection and pyrotechnic separation device comprising:
    a pyrotechnic composition installed in a connecting area between first and second elements configured to be separated;
    at least one connecting component configured to normally occupy an assembled position to simultaneously contact the first and second elements; and
    a moving part configured to normally occupy a first position to maintain the at least one connecting component in the assembled position,
    wherein the pyrotechnic composition is disposed to displace the moving part to a second position to release the at least one connecting component when the pyrotechnic composition is activated,
    wherein the moving part is configured to slide over the first element, and the pyrotechnic composition is housed between two shoulders formed on the moving part and the first element, respectively, such that the at least one connecting component is secured in the assembled position when the moving part is in the first position and the activation of the pyrotechnic composition displaces the moving part away from the second element and releases the at least one connecting element, and
    wherein the first and second elements are cylindrical or oval and the moving part comprises a deformable section configured to enclose the at least one connecting component when the moving part is in the first position, said deformable section fitted with clamping means.

4. The device according to claim 3, wherein the deformable section comprises separate annular segments connected at centers to a principal section of the moving part, the clamping means interposed between adjacent ends of the segments.

5. The device according to claim 4, wherein the at least one of the connecting components comprises a U-bracket including an inner face with a first projecting part and a second projecting part configured to be disposed in a first recessed section in the first element and in a second recessed section in the second element when the at least one connecting component is in the assembled position.

6. The device according to claim 5, wherein said device comprises as many U-brackets as annular segments, each of the annular segments configured to enclose one of the U-brackets when the at least one connecting component is in the assembled position.

7. The device according to claim 3, wherein the clamping means comprises tension devices bearing on flanges attached to adjacent ends of the segments.

8. A temporary connection and separation device, comprising:
    a connecting component comprising first and second projections configured to prevent separation of a first element from a second element; and a moving part positionable between a first position covering at least a portion of the connecting component to prevent the separation of the first and second elements and a second position uncovering the connecting component to permit separation of the first and second elements, the moving part configured to achieve the second position in response to activation of a pyrotechnic device.

9. The temporary connection and separation device according to claim 8, further comprising:

a pyrotechnic device disposed between the moving part and one of the first and second elements.

10. The temporary connection and separation device according to claim 8, wherein the connecting component comprises an about U-shaped member.

11. The temporary connection and separation device according to claim 8, further comprising:

first and second elements defining first and second recesses, wherein the first and second projections of the connecting component are configured to be disposed in the first and second recesses.

12. The temporary connection and separation device according to claim 8, further comprising:

first and second elements defining first and second recesses, wherein the first projection of the connecting component is configured to be disposed in the first recess and the second projection is configured to be disposed in the second recess.

13. The temporary connection and separation device according to claim 8, wherein the moving part is configured to move from the first position to the second position while contacting at least one of the first and second elements.

* * * * *